(12) United States Patent
Huang et al.

(10) Patent No.: US 11,003,282 B2
(45) Date of Patent: May 11, 2021

(54) TOUCH CONTROLLER AND NOISE DETECTION METHOD USING THE SAME

(71) Applicant: Novatek Microelectronics Corp., Hsinchu (TW)

(72) Inventors: Chun-Ching Huang, Hsinchu County (TW); Fang-Chun Lan, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/596,705

(22) Filed: Oct. 8, 2019

(65) Prior Publication Data

US 2021/0103376 A1 Apr. 8, 2021

(51) Int. Cl.
*G06F 3/041* (2006.01)

(52) U.S. Cl.
CPC ...... *G06F 3/04182* (2019.05); *G06F 3/04186* (2019.05)

(58) Field of Classification Search
CPC .................. G06F 3/04182; G06F 3/04186

USPC ......................................................... 345/173
See application file for complete search history.

(56) References Cited

U.S. PATENT DOCUMENTS

2019/0050075 A1* 2/2019 Reynolds ................ G06F 3/044

\* cited by examiner

*Primary Examiner* — Amare Mengistu
*Assistant Examiner* — Gloryvid Figueroa-Gibson
(74) *Attorney, Agent, or Firm* — JCIPRNET (57) ABSTRACT

A touch controller and a noise detection method that are capable of accurately detecting noises in a sensing signal are introduced. The touch controller may include a demodulator that is configured to receive a sensing signal and demodulate the sensing signal with a first frequency during a touch detection period. The demodulator may include a first filter that is configured to perform a noise detection operation on the sensing signal to output a first noise detection signal with a second frequency range adjacent to the first frequency. The first filter may have a plurality of peak frequencies different from the first frequency.

14 Claims, 10 Drawing Sheets

TOUCH CONTROLLER AND NOISE DETECTION METHOD USING THE SAME

BACKGROUND

Technical Field

The disclosure generally relates to a touch controller and a noise detection method that are capable of accurately detecting noise contaminated in a sensing signal.

Description of Related Art

A touch panel is used in a wide range of applications and devices such as cell phones, wearable devices, computers, and the like. The touch panel may output a sensing signal indicating whether a touch is detected. However, the sensing signal is usually contaminated by noises that may occur before or during a sensing operation on the touch panel. The noises may degrade the touch detection accuracy, thereby reducing performance of the touch panel.

As a demand for a high-performance touch device has grown recently, there has grown a need for a creative design of a touch controller and a noise detection method that are capable of accurately detecting noises in a sensing signal.

Nothing herein should be construed as an admission of knowledge in the prior art of any portion of the present disclosure.

SUMMARY

A touch controller and a noise detection method that are capable of accurately detecting noises in a sensing signal are introduced herein.

In some embodiments, the touch controller may include a demodulator that is configured to receive a sensing signal and demodulate the sensing signal with a first frequency during a touch detection period. The demodulator may include a first filter that is configured to perform a noise detection operation on the sensing signal to output a first noise detection signal with a second frequency range adjacent to the first frequency. The first filter may have a plurality of peak frequencies different from the first frequency.

In some embodiments, the touch controller may include a demodulator that is configured to receive a sensing signal and demodulate the sensing signal. The demodulator may include a low-pass filter and a first filter. The low-pass filter is configured to perform a filtering operation on the sensing signal to output the filtered sensing signal with a first frequency during a touch detection period. The first filter is configured to perform a noise detection operation on the sensing signal to output noise detection signal during the touch detection period.

In some embodiments, the noise detection method for detecting noise of a touch panel includes steps of receiving a sensing signal and demodulating the sensing signal with a first frequency from the touch panel during a touch detection period; and performing a noise detection operation on the sensing signal to output a first noise detection signal with a second frequency range adjacent to the first frequency via a first filter, wherein the first filter has a plurality of peak frequencies different from the first frequency.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
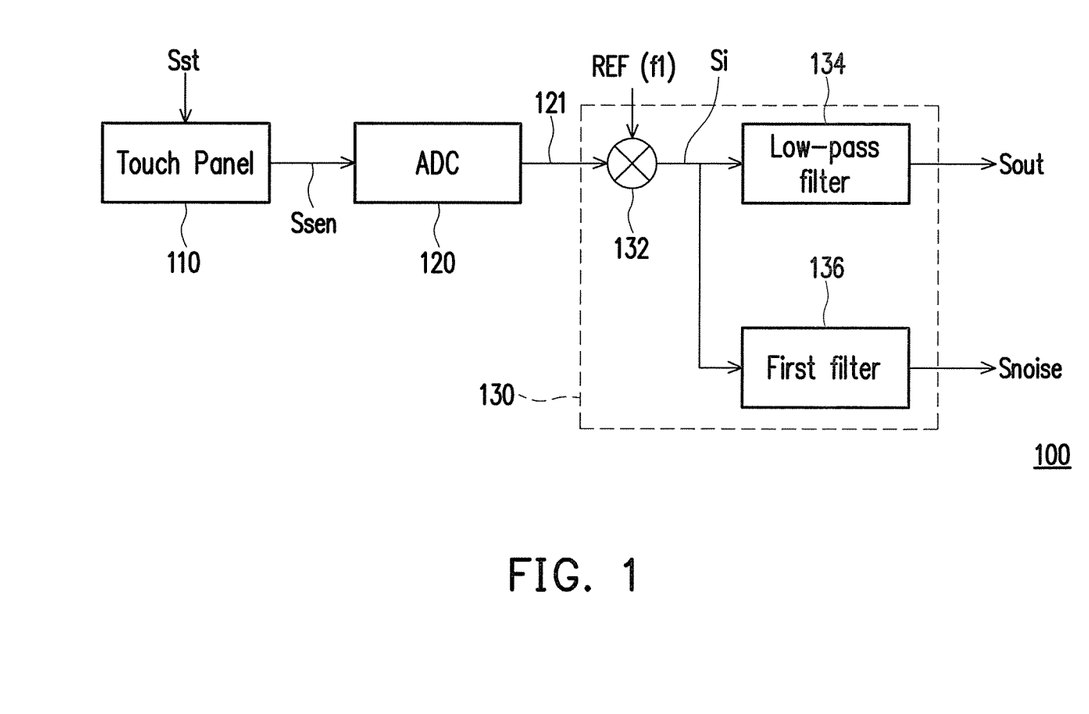
FIG. 1 is a schematic diagram illustrating a touch sensing system in accordance with some embodiments.

Referring to FIG. 1, a touch sensing system 100 may include a touch panel 110, an analog-to-digital converter (ADC) 120 and a demodulator 130. The ADC 120 and the demodulator 130 may be disposed in a touch sensor (not shown), which may be implemented as a chip. The touch sensing system 100 is configured to perform touch detection, in which the touch sensor can trigger a specified wave to the touch panel 110 and then observe a received wave amplitude by performing a demodulation process. More specifically, the touch panel 110 may receive a stimulation signal Sst from the touch sensor, and output a sensing signal Ssen based on the stimulation signal Sst to the touch sensor. The stimulation signal Sst may be generated by a stimulation circuit (not shown), and is used to trigger a stimulus with a specified frequency on the touch panel 110. In some embodiments, the touch panel 100 may be divided into a plurality of blocks, and the stimulation signal Sst is provided to each of the blocks according to a designed sequence so as to generate the sensing signal Ssen. The sensing signal Ssen may be used by the touch sensor to detect an occurrence of a touch event (e.g., a finger touch, a stylus touch, and the like) on the touch panel 110. For example, the occurrence of the touch even may be detected based on a change of an electrical level or energy of the sensing signal Ssen at a sensing frequency.

The ADC 120 is coupled to the touch panel 110 to receive the sensing signal Ssen, and is configured to convert the sensing signal Ssen to generate a digital code 121. In other words, the digital code 121 is a digital representation of the sensing signal Ssen. In some embodiments, an average power of the sensing signal Ssen is equivalent to an average power of the digital code 121 but the disclosure is not limited thereto. It is noted that a type and structure of the ADC 120 is not limited in the disclosure.

In some embodiments, the demodulator 130 is coupled to the ADC 120 to receive the digital code 121 from the ADC 120. The demodulator 130 is configured to perform a demodulation operation based on the digital code 121 (or the representation of the sensing signal Ssen) using a frequency f1 of a reference digital signal REF during a touch detection period. The frequency f1 can be arranged to be the same as the specified frequency of the stimulus triggered on the touch panel 110. During the touch detection period, the touch sensing system 100 is configured to detect whether a touch event occurs on the touch panel 100 of the touch sensing system 100. The reference digital signal REF may be a digital cosine and sine samples generated by a direct-digital synthesizer (not shown) in the touch sensor, but the disclosure is not limited thereto.

In some embodiments, the demodulator 130 may include a mixer 132, a low-pass filter (LPF) 134 and a first filter 136. The mixer 132 is coupled to the ADC 120, and is configured to mix the digital code 121 with the reference digital signal REF to generate the mixed signal Si. The mixed signal Si may include a baseband signal that is translated by the mixer 132 based on the digital code 121. The LPF 134 is coupled to an output of the mixer 132 to receive the mixed signal Si, and is configured to perform a filtering operation on the mixed signal Si to generate a filtered sensing signal Sout. For example, the LPF 134 may filter out high-frequency component of the mixed signal Si to obtain the filtered sensing signal Sout (e.g., the baseband signal).

In some embodiments, the first filter 136 is coupled to the mixer 132, and is configured to perform a first filtering operation to detect noise that is contaminated in the sensing signal Ssen. More particularly, the first filter 136 may perform a noise detection operation on the sensing signal Ssen to output a noise detection signal Snoise. The sensing signal Ssen can have a frequency range adjacent or close to the frequency f1 of the reference digital signal REF. In some embodiments, the first filter 136 is configured to perform the noise detection operation during the touch detection period. In other words, the touch detection operation and the noise detection operation may be performed simultaneously. Or the noise detection can be performed during the touch detection operation. In other embodiments, the noise detection may be performed alternately with the touch detection operation.

Figure 2A:
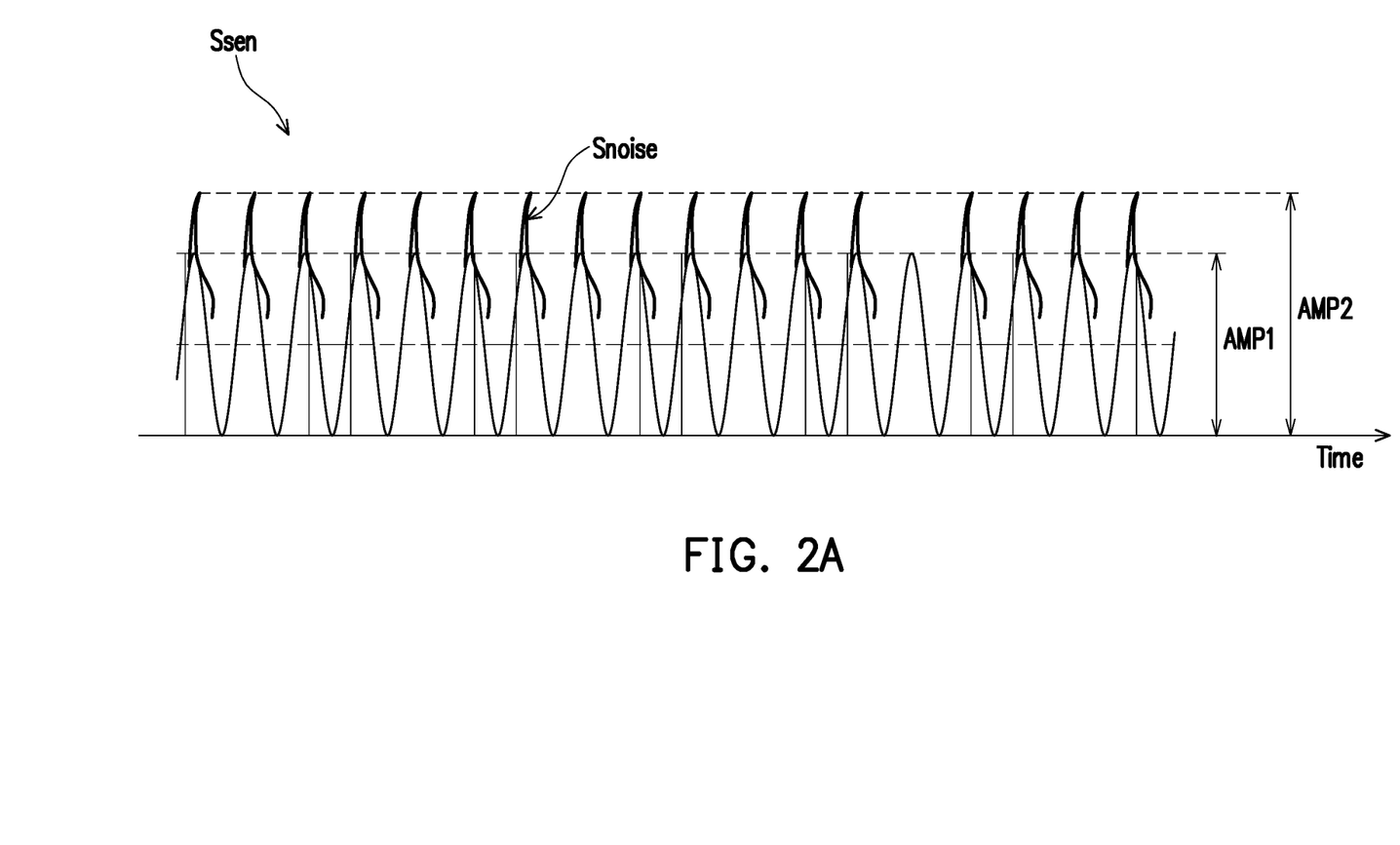
FIG. 2A is a timing diagram illustrating a sensing signal and a noise signal in accordance with some embodiments.

Referring to FIG. 1 and FIG. 2A, a timing diagram of the sensing signal Ssen and the noise signal Snoise is illustrated in accordance with some embodiments. The noise signal Snoise may indicate noises that are contaminated into the sensing signal Ssen. As a result of the noise signal Snoise, an amplitude AMP2 of the sensing signal Ssen may be different from an amplitude AMP1 of the baseband signal, in which the baseband signal is a noise-free signal. As shown in FIG. 2A, the amplitude AMP2 of the sensing signal Ssen is greater than the amplitude AMP1 of the baseband signal.

Figure 2B:
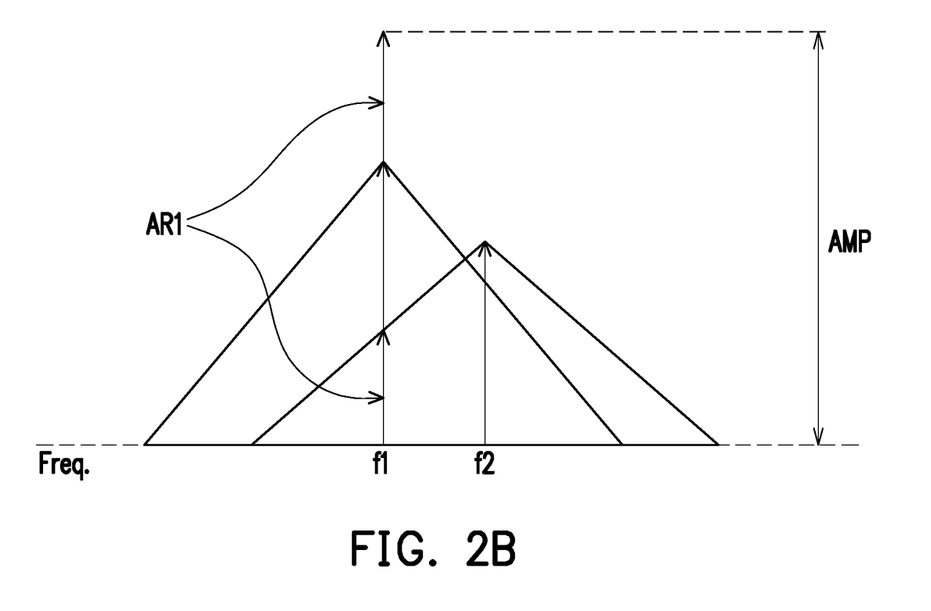
FIG. 2B through 2C are frequency diagrams illustrating a first filter, a sensing signal and a noise signal in accordance with some embodiments.

Referring to FIG. 1 and FIG. 2B, a frequency diagram of the sensing signal Ssen and the noise signal Snoise is illustrated in accordance with some embodiments. The sensing signal Ssen has a center frequency f1; and the noise signal Snoise has a center frequency f2, in which the center frequency f2 of the noise signal Snoise is relatively close to the center frequency f1 of the sensing signal Ssen. In some embodiments, the center frequency f1 of the sensing signal is the same as the frequency f1 of the reference digital signal REF. As the center frequency f2 of the noise signal Snoise gets closer to the center frequency f1 of the sensing signal Ssen, the influence of the noise signal Snoise to the sensing signal Ssen becomes greater, causing an accuracy of a touch detection result based on the sensing signal Ssen to be worse. The arrow AR1 shown in FIG. 2B indicates the influence of the noise signal Snoise to amplitude AMP of the sensing signal Ssen.

Figure 2C:
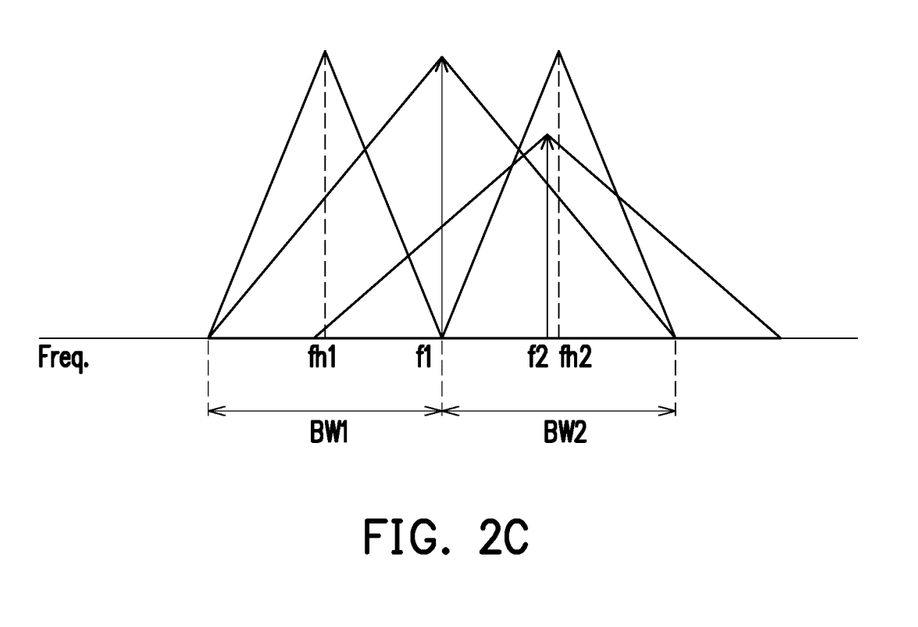

Referring to FIG. 1 and FIG. 2C, a frequency diagram of the first filter 136, the sensing signal Ssen and the noise signal Snoise is illustrated in accordance with some embodiments. The first filter 136 may have a plurality of peak frequencies fh1 and fh2, wherein the peak frequency fh1 is smaller than the center frequency f1 of the sensing signal and the peak frequency fh2 is greater than the center frequency f1 of the sensing signal. In other words, the peak frequencies fh1 and fh2 of the first filter 136 are located in two sides of the center frequency f1 of the sensing signal Ssen. In some embodiments, the peak frequency fh1 of the first filter 136 is symmetrical with the peak frequency fh2 of the first filter 136 through the center frequency f1 of the sensing signal Ssen.

In some embodiments, the first filter 136 has a bandwidth that includes a bandwidth part BW1 and a bandwidth part BW2, in which the frequencies that form the bandwidth part BW1 are lower than the center frequency f1 of the sensing signal Ssen and the frequencies that form the bandwidth part BW2 are greater than the center frequency f1 of the sensing signal Ssen.

In some embodiments, the frequency range of the noise signal Snoise may be located in at least one of the bandwidth parts BW1 and BW2 of the first filter 136. As such, the center frequency f2 of the noise signal Snoise is located in the bandwidth part BW1 or the bandwidth part BW2. As shown in FIG. 2C, the center frequency f2 of the noise signal Snoise is located in the bandwidth part BW2 of the first filter 136. When the frequency range of the noise signal is located in at least one of the bandwidth parts BW1 and BW2 of the first filter 136, the first filter 136 may effectively detect the noise signal Snoise that is contaminated into the sensing signal Ssen.

Referring FIG. 1 and FIG. 2A through 2C, the LPF 134 and the first filter 136 may have the same bandwidth with the same center frequency. In some embodiments, the LPF 134 may perform the noise detection operation to detect a background noise during a noise detection period which is prior to the touch detection period. During the noise detection period, the touch sensor may not be configured to trigger a specified wave to touch panel 110 and only sense an amplitude of the noise. In some embodiments, the frequency for the LPF 134 to detect the background noise during the noise detection period may be the same as the center frequency used by the first filter 136 to detect the noise signal during the touch detection period. In some other embodiments, the frequency for the LPF 134 to detect the background noise during the noise detection period may be different from the center frequency used by the half diff first filter 136 to detect the noise signal during the touch detection period.

Figure 3:
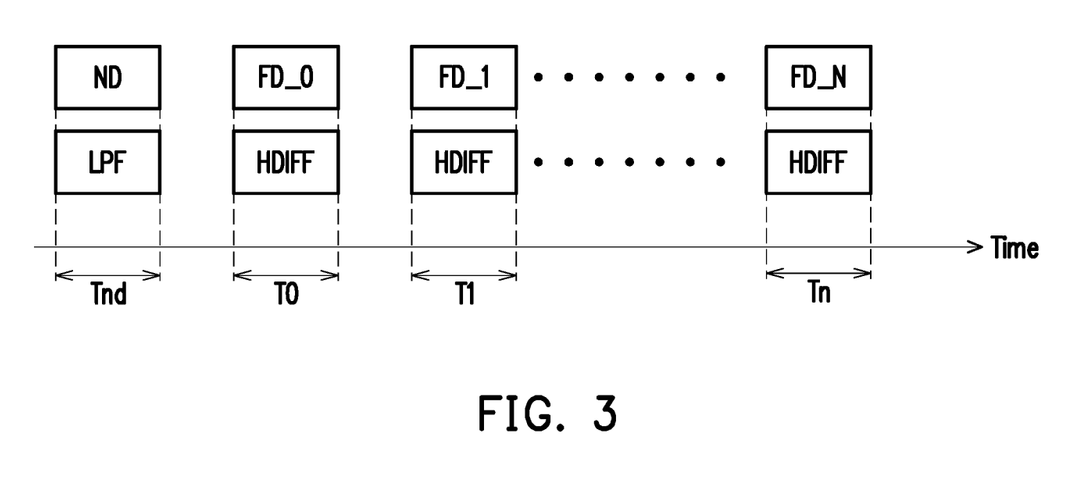
FIG. 3 is a timing diagram illustrating a filtering operation and a touch detection operation in accordance with some embodiments.

Referring to FIG. 3, a timing diagram illustrating operations in a noise detection period Tnd and a plurality of touch detection periods T0 through Tn is illustrated in accordance with some embodiments. In some embodiments, touch detection operations FD_0 through FD_N are performed during the touch detection periods T0 through Tn, respectively, to detect whether a touch event occurs on the touch panel. Meanwhile, during each of the touch detection periods T0 though Tn, a first filtering operation HDIFF is performed to detect the noises that are contaminated in the sensing signal Ssen. In other words, in each of the touch detections periods T0 through Tn, a first filtering operation HDIFF and a touch detection operation among the touch detection operations FD_0 through FD_N are performed. In this way, even the noise that occurs during the touch detection period may be detected by the first filtering operation HDIFF.

In some embodiment, a background noise detection operation which is indicated as "LPF" in FIG. 3 is performed during the noise detection period Tnd. The noise detection period Tnd is prior to the touch detection periods T0 through Tn. In other words, the background noise detection operation may be performed before the execution of the touch detection operation FD_0 though FD_N, thereby detecting noises that exist in the touch sensing system even no touch is occurred. In some embodiments, the background noise detection operation LPF may be a low-pass filter operation that is performed by the LPF (e.g., LPF 134) of the demodulator. The noises detected during the background noise detection period Tnd and the noises detected during the touch detection periods T0 though Tn may be used to eliminate noises contaminated in the sensing signal Ssen.

Figure 4:
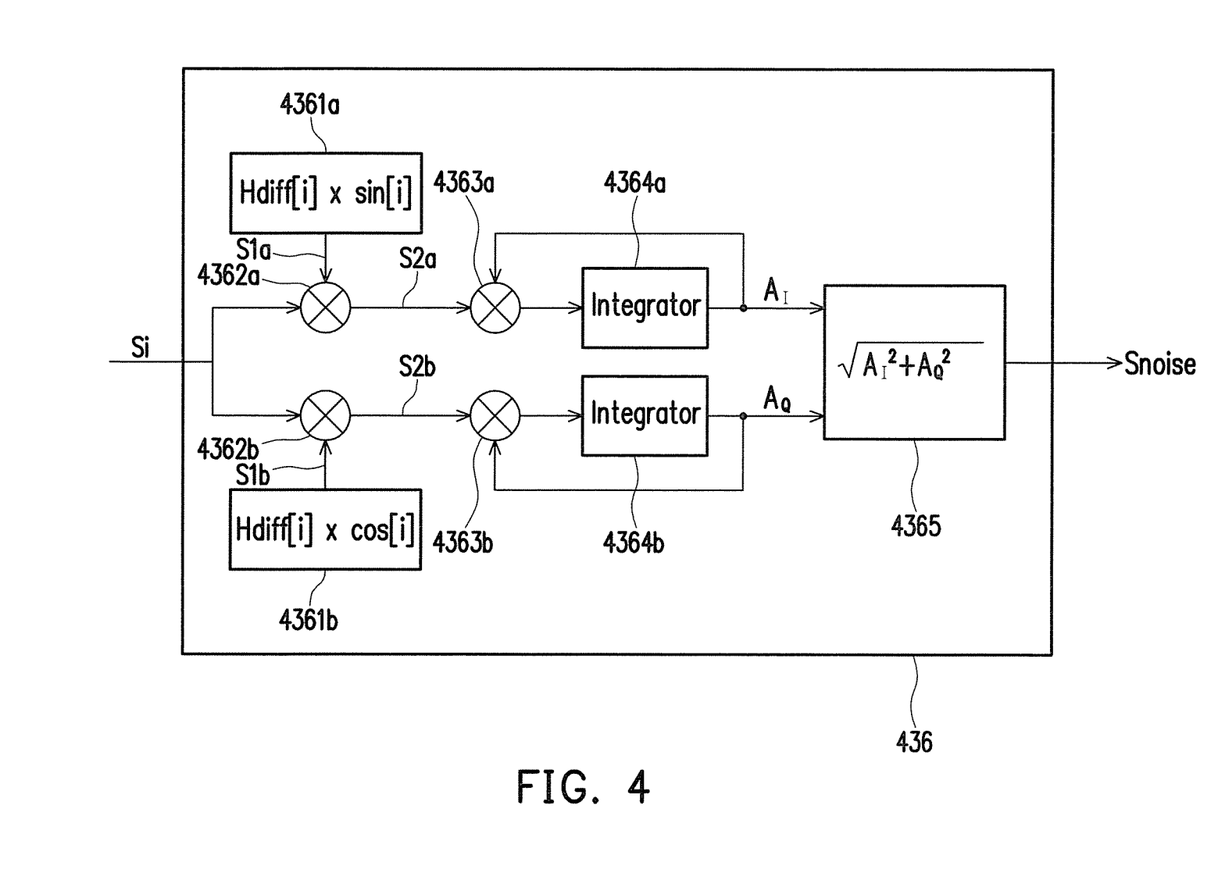
FIG. 4 is a schematic diagram illustrating a first filter in accordance with some embodiments.

Referring to FIG. 4, a schematic diagram of a first filter 436 is illustrated in accordance with some embodiments. The first filter 436 may include logic circuits 4361a and 4361b, mixers 4362a and 4362b, adders 4363a and 4363b, integrators 4364a and 4364b and a logic circuit 4365. It is assumed that there are N sampling points during a specified sensing period, where N is a positive integer. In each sampling point i among the N sampling points, the logic circuit 4361a may obtain a first value Hdiff[i] and a value of sin[i], and may perform a mathematical operation on the values of Hdiff[i] and sin[i] so as to generate a value S1a. In addition, in each sampling point i among the N sampling points, the logic circuit 4361b may obtain values Hdiff[i] and cos[i] and may perform a mathematical operation on the values of Hdiff[i] and cos[i] so as to generate a value S1b. In some embodiments, the logic circuit 4361a may multiply the value of the Hdiff[i] with the value of sin[i] to generate the value S1a, and the logic circuit 4361b may multiply the value of the Hdiff[i] with the value of cos[i] to generate the value S1b. The value of Hdiff[i] may be determined based on equation (1), in which N is the total number of sampling points during the specified period and i is a sampling point among the N sampling points.

$$Hdiff[i] = \begin{cases} i = 0 \sim \frac{N}{2} - 1, \ 0.5 * \left(1 - \cos\left(\frac{2\pi i}{\frac{N}{2} - 1}\right)\right) \\ i = \frac{N}{2} \sim N - 1, \ -0.5 * \left(1 - \cos\left(\frac{2\pi\left(i - \frac{N}{2}\right)}{\frac{N}{2} - 1}\right)\right) \end{cases} \quad (1)$$

The mixers 4362a and 4362b are coupled to the logic circuits 4361a and 4361b, respectively. The mixer 4362a is configured to mix the signal Si with the value S1a that is generated by the logic circuits 4361a to generate the value S2a. Similarly, the mixer 4362b is configured to mix the signal Si with the value S1b that is generated by the logic circuits 4361b to generate the value S2b. The adders 4363a and the integrator 4364a are configured to generate an in-phase component $A_I$ of the noise signal Snoise; and the adders 4363b and the integrator 4364b are configured to generate quadrature component $A_Q$ of the noise signal Snoise. It is noted that the in-phase component $A_I$ and the quadrature component $A_Q$ may be fed back to the adders 4363a and 4363b, respectively. The adder 4363a may add the value S2a with the feedback in-phase component $A_I$; and the adder 4363b may add the value S2b with the feedback quadrature component $A_Q$.

The logic circuit 4365 is configured to generate the noise signal Snoise based on the in-phase component $A_I$ and the quadrature component $A_Q$. In some embodiments, the logic circuit 4365 may sum a square value of the in-phase component $A_I$ and a square value the quadrature component $A_Q$ to obtain a summation result, and then perform a square root operation on the summation result to obtain the noise signal Snoise.

Figure 5A:
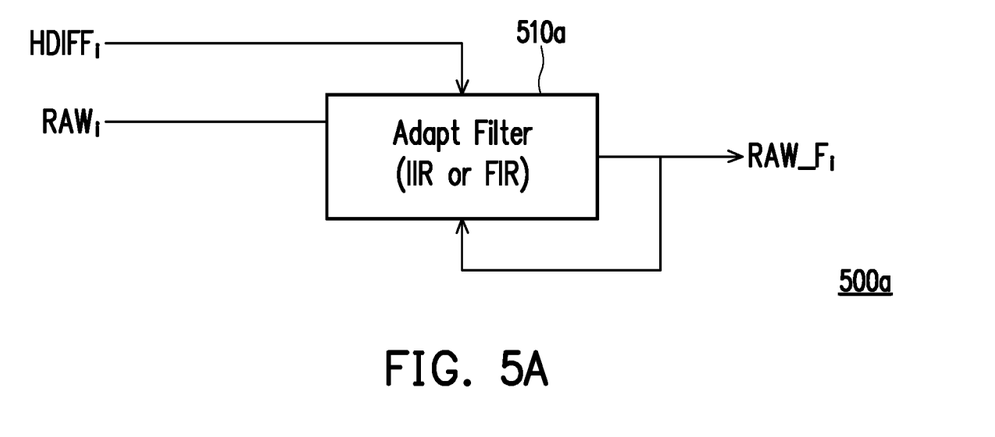
FIGS. 5A through 5D are schematic diagrams illustrating touch sensing systems with adaptive filters in accordance with some embodiments.

Referring to FIG. 5A, a touch sensing system 500a that includes an adaptive filter 510a is illustrated. The adaptive filter 510a may receive a sensing data frame RAWi for a ith frame and a corresponding output HDIFFi for the ith frame provided by a first filter (e.g., first filter 136 illustrated in FIG. 1), and is configured to generate a filtered frame RAW_Fi based on the sensing data frame RAWi and the output HDIFFi of the first filter. In some embodiments, the adaptive filter 510a may include at least one of a finite impulse response (FIR) filter and infinite impulse response (IIR) filter, in which parameters of the FIR and the IIR may be adjusted based on the value of HDIFFi of the first filter. For example, when the HDIFFi indicates that there are too much noises in the sense data frame RAWi, the FIR filter or the IIR filter may adjust the parameters of the FIR filter or the IIR filter, thereby reducing the weight of the sensing data frame RAWi in a touch detection operation. In this way, the accuracy of the touch detection operation is improved.

Figure 5B:
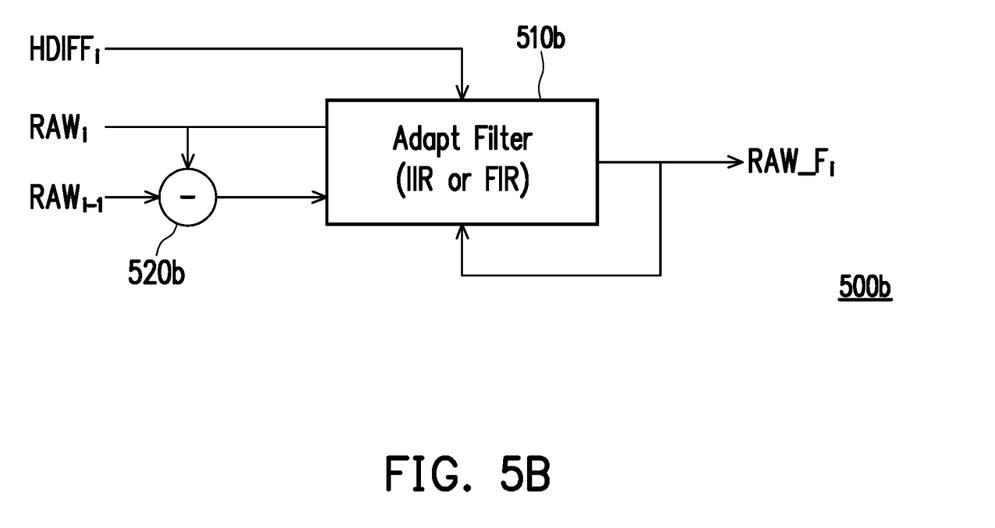

Referring to FIG. 5B, a touch sensing system 500b that includes an adaptive filter 510b is illustrated. A difference between the touch sensing system 500a illustrated in FIG. 5A and the touch sensing system 500b illustrated in FIG. 5B is that the touch sensing system 500b further includes a difference counter 520b that is configured to calculate a difference between consecutive sense data frames RAWi and RAWi-1. The adaptive filter 510b may generate the filtered sense data frame RAW_Fi based on the output HDIFFi of a first filter, the sense data frame RAWi and an output of the difference counter 520b. In some embodiments, when the difference counter 520b indicates that difference between adjacent sense data frames RAWi and RAWi-1 is greater than predetermined threshold value, it indicates that a touch event may occur or disappear in the touch panel. Accordingly, the adaptive filter 510b may ignore or weaken the weights or functions of HDIFFi of a first filter.

Figure 5C:
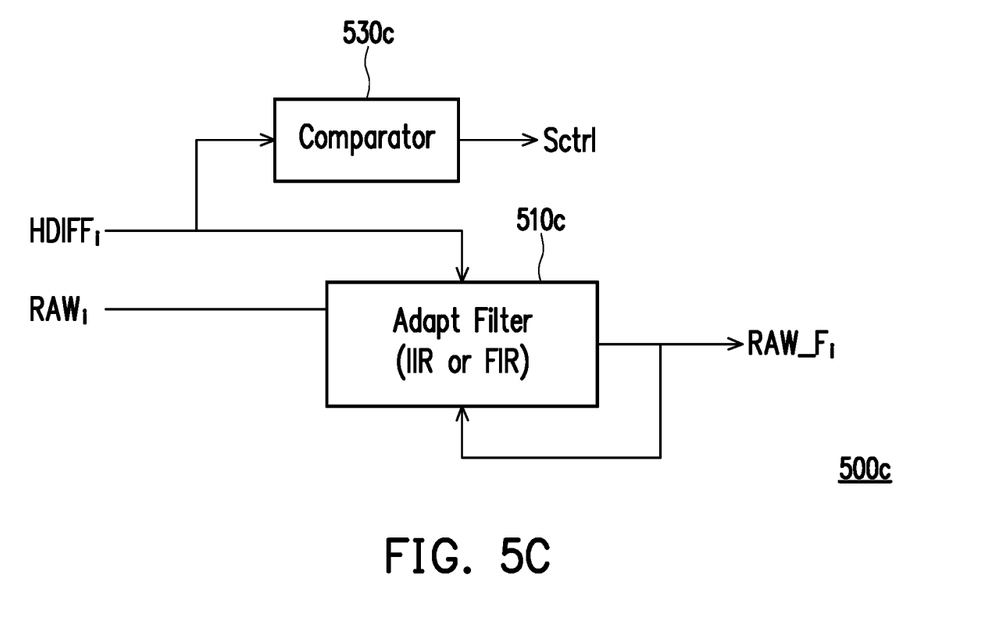

Referring to FIG. 5C, a touch sensing system 500c that includes an adaptive filter 510c and a comparator 530c is illustrated. A difference between the touch sensing system 500a illustrated in FIG. 5A and the touch sensing system 500c illustrated in FIG. 5C is that the touch sensing system 500c further includes a comparator 530c that is coupled to receive the value of HDIFFi. In some embodiments, when the comparator 530c determines that the value of HDIFFi is greater than a predetermined threshold value, it indicates that too much noises are in the current frame RAWi with the current frequency. Accordingly, the comparator 530c may output a control signal Sctrl that is used to switch the frequency for sensing data of a touch panel of the touch sensing system 500c Consequently, the specified frequency of the stimulus triggered on the touch panel and the frequency of the reference digital signal used in the demodulator can be switched when the the value of HDIFFi is greater than a predetermined threshold value.

Figure 5D:
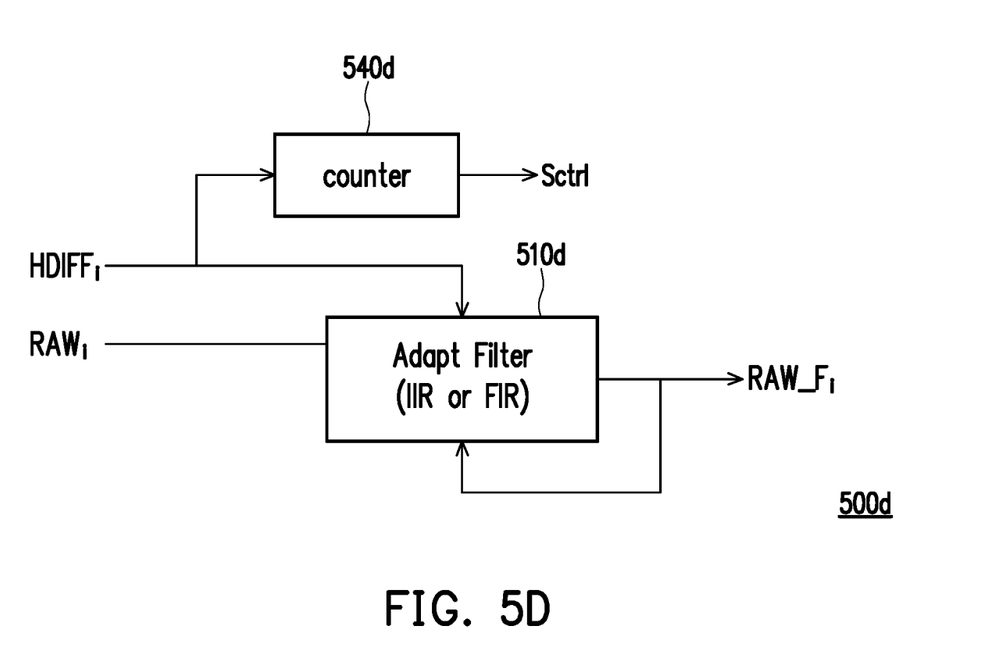

Referring to FIG. 5D, a touch sensing system 500d that includes an adaptive filter 510d and a comparator 530d is illustrated. A difference between the touch sensing system 500a illustrated in FIG. 5A and the touch sensing system 500d illustrated in FIG. 5D is that the touch sensing system 500d further includes a counter 540d that is coupled to receive the value of HDIFFi. In some embodiments, when the counter 540d determines that too much noises are detected for several frames, the counter 540d may output a control signal Sctrl that is used to switch the frequency for sensing data of a touch panel of the touch sensing system 500d. Consequently, the specified frequency of the stimulus triggered on the touch panel and the frequency of the reference digital signal used in the demodulator can be switched when the the value of HDIFFi is greater than a predetermined threshold value.

Referring to FIG. 1 and FIG. 5A through FIG. 5D, the value HDIFFi may be obtained based on the noise signal Snoise that is outputted by the first filter 136 as illustrated in FIG. 1. In other words, the systems 510a through 510d may be considered as alternative extensions of the touch sensing system 100 as illustrated in FIG. 1. For example, the adaptive filter 510a as shown in FIG. 5A may be coupled to the demodulator 130 of the touch sensing system 100, but the disclosure is not limited thereto. In addition, at least one of the difference counter 520b in FIG. 5B, the comparator 530c in FIG. 5C and the counter 540d in FIG. 5D may be combinable in other embodiments.

Figure 6A:
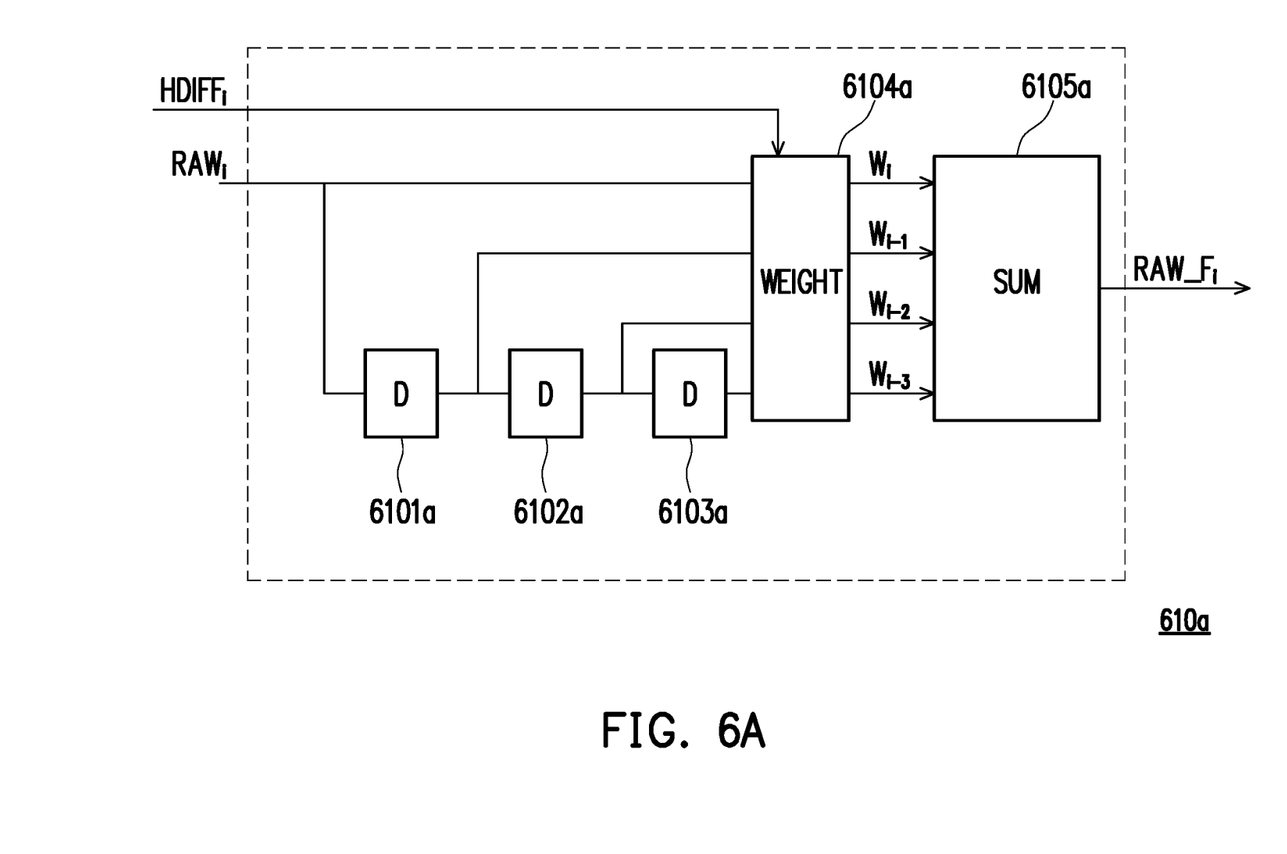
FIG. 6A is a block diagram illustrating an adaptive filter that includes a finite impulse response (FIR) filter in accordance with some embodiments.

Referring to FIG. 6A, an adaptive filter that includes a FIR filter 610a is illustrated in accordance with some embodiments. The FIR filter 610a may include a plurality of delay elements 6101a through 6103a, a weighting circuit 6104a and a summation circuit 6105a. The delay elements 6101a through 6103a are configured to delay the sense data frame RAWi to generate different delayed frames. The weighting circuit 6104a may receive the sense data frame RAWi, the delayed frames and the value of HDIFFi, and is configured to adjust the weights $W_{i-3}$ through $W_i$ based on the value of HDIFFi. The summation circuit 6105a is configured to generate the filtered data frame RAW_Fi based on the adjusted weights $W_{i-3}$ through $W_i$.

Figure 6B:
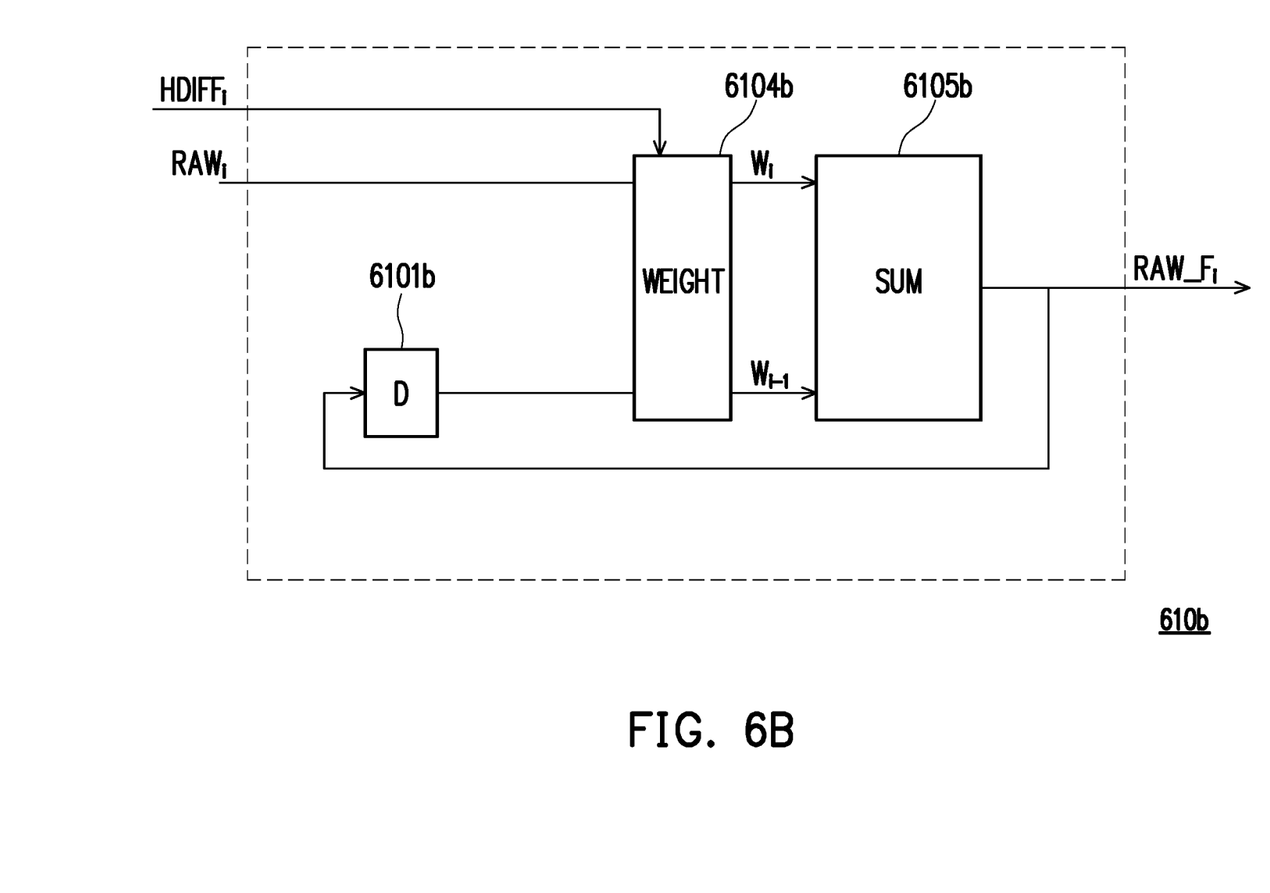
FIG. 6B is a block diagrams illustrating an adaptive filter that includes an infinite impulse response (IIR) filter in accordance with some embodiments.

Referring to FIG. 6B, an adaptive filter that includes an IIR filter 610b is illustrated in accordance with some embodiments. The IIR filter 610b may include a delay element 6101b, a weighting circuit 6104b and a summation circuit 6105b. The delay element 6101b is configured to delay the sense data frame RAWi to generate a delayed frame. The weighting circuit 6104b may receive the sense data frame RAWi, the delayed frame and the value of HDIFFi, and is configured to adjust the weights $W_{i-1}$ through $W_i$ based on the value of HDIFFi. The summation circuit 6105b is configured to generate the filtered data frame RAW_Fi based on the adjusted weights $W_{i-1}$ through $W_i$.

Figure 7:
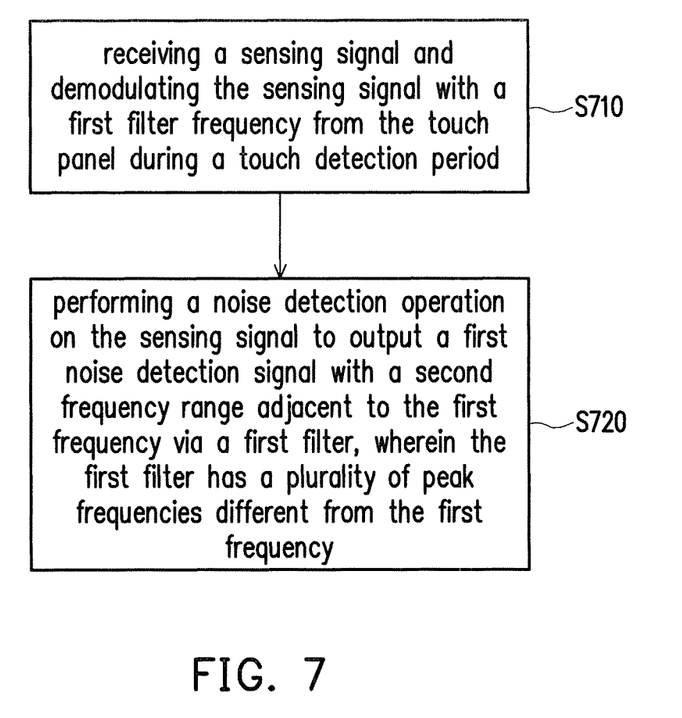
FIG. 7 is a flowchart diagram illustrating a noise detection method in accordance with some embodiments.

Referring to FIG. 7, a flowchart diagram illustrating a noise detection method is illustrated in accordance with some embodiments. In step S710, a sensing signal is received and the sensing signal is demodulated with a first frequency from the touch panel during a touch detection period. In step S720, a noise detection operation is performed on the sensing signal to output a first noise detection signal with a second frequency range adjacent to the first frequency via a first filter, wherein the first filter has a plurality of peak frequencies different from the first frequency.

In summary, in some embodiments of the disclosure, a first filter is included in a touch sensing system for detecting noises contaminated into a sensing signal at a frequency during touch detection periods. The first filter may have a plurality of peak frequencies, in which at least one of the peak frequencies is less than the frequency of the sensing signal and at least one of the peak frequencies is greater than the frequency of the sensing signal. The first filter may have a bandwidth formed by a first bandwidth part and a second bandwidth part located at two sides of the frequency of the sensing signal. In this way, noises with frequency ranges adjacent to the frequency of the sensing signal may be more accurately detected by the first filter. Furthermore, a low-pass filter of the touch sensing system may be used to detect noises during a noise detection period that may be arranged to be prior to the touch detection period. As such, the detection accuracy of the noises contaminated into the sensing signal is further improved. The noises detected by the first filter may be used to adjust the touch detection operation), so as to improve the accuracy of touch detection operation. In some embodiments, when first filter detects noise, a controller in the touch sensor can lower a weight of current raw data to reduce interference. This may be achieved by adjusting parameters of an adaptive filter (e.g., IIR or FIR filters). In some other embodiments, when the first filter detects an amplitude of noise greater than a predetermined threshold, the frequency for sensing data of a touch panel of the touch sensing system can be switched.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A touch controller, comprising:
    a demodulator, receiving a sensing signal and demodulating the sensing signal with a first frequency during a touch detection period,
    wherein the demodulator comprises a first filter configured to perform a noise detection operation on the sensing signal to output a first noise detection signal with a second frequency range adjacent to the first frequency, wherein the first filter has a plurality of peak frequencies different from the first frequency,
    wherein the peak frequencies comprise a first peak frequency and a second peak frequency which is symmetrical with the first peak frequency, the first filter has a first bandwidth comprising a first part and a second part respectively lower and higher than the first frequency, and the first peak frequency is a center frequency of the first part, and the second peak frequency is a center frequency of the second part.

2. The touch controller of claim 1, wherein the first filter performs the noise detection operation during the touch detection period.

3. The touch controller of claim 1, wherein the second frequency range is located in the first part or the second part.

4. The touch controller of claim 1, wherein the demodulator further comprises a second filter configured to perform a filtering operation on the sensing signal to output the filtered sensing signal with the first frequency during the touch detection period.

5. The touch controller of claim 4, wherein the second filter is a low pass filter.

6. The touch controller of claim 4, wherein the first filter has a first bandwidth and the second filter has a second bandwidth the same as the first bandwidth.

7. The touch controller of claim 4, wherein the second filter has a center frequency the same as the first frequency.

8. The touch controller of claim 4, wherein the second filter is further configured to perform the noise detection operation to detect a background noise and output a second noise detection signal with the first frequency during a noise detection period.

9. The touch controller of claim 8, wherein the noise detection period is different from the touch detection period.

10. A touch controller, comprising:
a demodulator, receiving a sensing signal and demodulating the sensing signal, wherein the demodulator comprises:
a low pass filter, configured to perform a filtering operation on the sensing signal to output the filtered sensing signal with a first frequency during a touch detection period; and
a first filter, configured to perform a noise detection operation on the sensing signal to output noise detection signal during the touch detection period,
wherein the first filter comprises a first peak frequency and a second peak frequency which are symmetrical with the first frequency, the first filter has a first bandwidth comprising a first part and a second part respectively lower and higher than the first frequency, and the first peak frequency is a center frequency of the first part, and the second peak frequency is a center frequency of the second part.

11. The touch controller of claim 10, wherein the noise detection signal has a second frequency range adjacent to the first frequency.

12. The touch controller of claim 10, wherein the low pass filter has a center frequency the same as the first frequency.

13. A noise detection method for detecting noise of a touch panel, comprising:
receiving a sensing signal and demodulating the sensing signal with a first frequency from the touch panel during a touch detection period; and
performing a noise detection operation on the sensing signal to output a first noise detection signal with a second frequency range adjacent to the first frequency via a first filter during the touch detection period, wherein the first filter has a plurality of peak frequencies different from the first frequency,
wherein the peak frequencies comprise a first peak frequency and a second peak frequency which is symmetrical with the first frequency, the first filter has a first bandwidth comprising a first part and a second part respectively lower and higher than the first frequency, and the first peak frequency is a center frequency of the first part, and the second peak frequency is a center frequency of the second part.

14. The noise detection method of claim 13, further comprising:
performing a filtering operation on the sensing signal to output the filtered sensing signal with the first frequency during the touch detection period.

* * * * *